Figure 1:
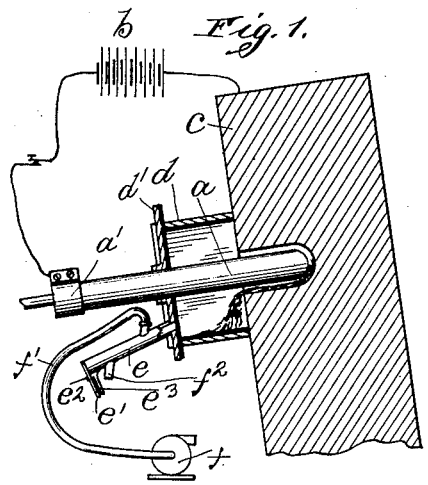

No. 650,124. Patented May 22, 1900.
C. COLEMAN.
ELECTRIC METAL WORKING APPARATUS.
(Application filed July 29, 1897.)
(No Model.)

Witnesses:
R. J. Jacker,
M. R. Brelyford

Inventor:
Clyde Coleman
By Ludington + Jones,
Attorneys.

UNITED STATES PATENT OFFICE.

CLYDE COLEMAN, OF CHICAGO, ILLINOIS, ASSIGNOR, BY DIRECT AND MESNE ASSIGNMENTS, TO THE BANKERS ELECTRIC PROTECTIVE COMPANY, OF SAME PLACE.

ELECTRIC METAL-WORKING APPARATUS.

SPECIFICATION forming part of Letters Patent No. 650,124, dated May 22, 1900.

Application filed July 29, 1897. Serial No. 646,344. (No model.)

*To all whom it may concern:*

Be it known that I, CLYDE COLEMAN, a citizen of the United States, residing at Chicago, in the county of Cook and State of Illinois, have invented a certain new and useful Improvement in Electrical Metal-Working Apparatus, of which the following is a full, clear, concise, and exact description, reference being had to the accompanying drawings, forming a part of this specification.

My invention relates to electrical metal-working means, my object being to facilitate the working of metal, particularly metal of large bulk which cannot be readily transported to machine-tools and metal which is highly tempered and hardened, whereby working by mechanical means is very difficult.

My invention is particularly applicable to surface operations upon masses of metal and to the drilling of holes in bodies of metal of considerable thickness; but the invention is applicable to many other purposes as well.

In practicing my invention I employ the heating effect of the electric arc produced by either a direct or an alternating current, preferably the former. With direct current I preferably attach the positive pole of the battery or source of current to the mass of metal to be operated upon, and to the negative pole I attach an electrode, preferably a carbon rod. Upon touching the end of the rod to the metal and withdrawing it a short distance an arc is formed, the heating effect of which melts the metal at the point of application of the arc.

In order to shield the arc and muffle the noise due to the action of the arc, I provide a combined shield and muffle, which I shall hereinafter term a "muffle," which consists of a box or receptacle, through an opening in which the rod is passed, the edges of the muffle fitting against the face of the metal operated upon to thus shield the intense light from the operator's eyes and to prevent the escape of various products of the operation. The muffle also forms a receptacle for the molten metal. In order that the operation of the arc within the muffle may be observed, I provide a peep tube or window either upon the muffle or through the core of the carbon. In order to prevent the vapor and particles of metal due to the operation from filling the peep-tube and obscuring the vision, I preferably arrange an air draft or blast for forcing a fluid, as air, through the tube and preferably arrange a revolving glass window upon the end of the tube, which may be rotated to always present a clean surface.

Some metals when melted do not flow readily, while others do not readily melt and are therefore more readily fused and operated upon when formed into an alloy or compound with another material. As an auxiliary feature of my invention I provide means for supplying an agent—such as oxygen, sulfur, aluminium, or the like—to the metal at the point of application of the arc to cause the metal to fuse more readily or to flux and flow more easily. I preferably introduce the agent through the core of the carbon, since in this manner it may be effectively supplied to the metal in the vicinity of the arc. When in the form of gas or fluid, the agent may be supplied through a pipe connected with a pump or reservoir. When in solid form, it may be fed through the core of the carbon in the form of a stick. Sulfur may be supplied in the form of a stick or powder, or preferably in the form of a gas. Sulfid of iron may thus be formed. Aluminium is employed in the form of a stick or rod fed through the core to form mitis metal, which fluxes readily. Oxygen may be supplied to form an oxid or phosphorus to form a phosphid. Other agents may be similarly employed. These agents also assist the arc in eating away the metal. By the employment of chemical agents with the electric arc the process becomes more effective, both by the increased melting effect and by the more ready removal of the fused metal. This removal of the metal is an important feature in the drilling of holes through metal of such thickness as to necessitate the passage of the carbon rod beyond the surface of the body of metal operated upon. The problem presented in boring these long holes is the proper removal of the molten metal. This I accomplish chemically by the employment of fluxing agents, by gravity or magnetically, by subjecting the molten metal to the action of a magnetic field or by a combination of these. By the employment of this electrical method of boring holes I have produced holes as true to aline-
ment and with as perfect a bore as can be
produced by a drill and in much less time.
For very hard metal boring by a drill is very
slow and laborious, while the electric arc as-
sisted where necessary by chemical action is
not susceptible to the hardness of the metal
to anything like the same degree. In fact,
hardened steel is more readily drilled by the
electric arc than pure iron, due to the low
fusing-point of the steel and the greater flu-
idity or mobility of the steel when in the
melted state.

I have illustrated my invention in the ac-
companying drawings, in which—

Figure 2:
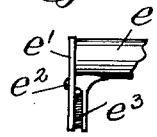
Figure 3:
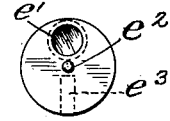
Figure 4:
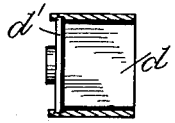
Figure 5:
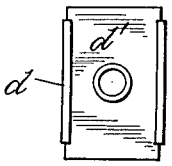
Figure 6:
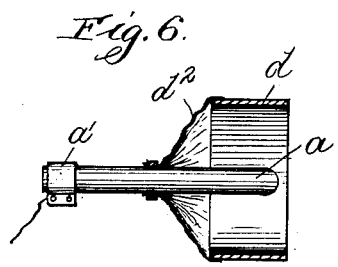
Figures 7, 8, 9:
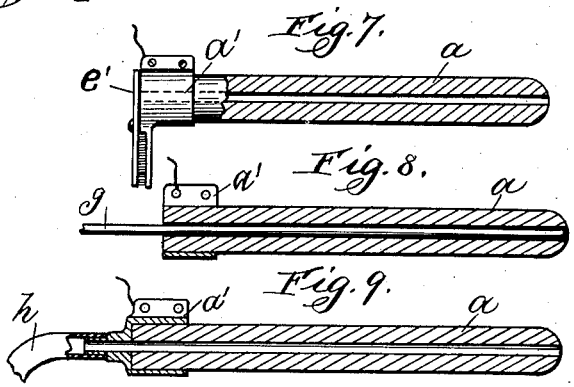
Figure 10:
Figure 11:
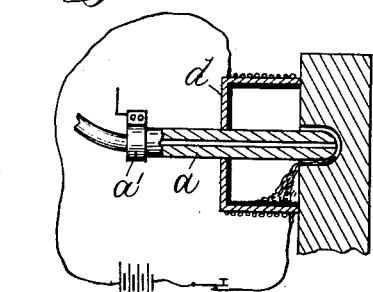
Figure 12:
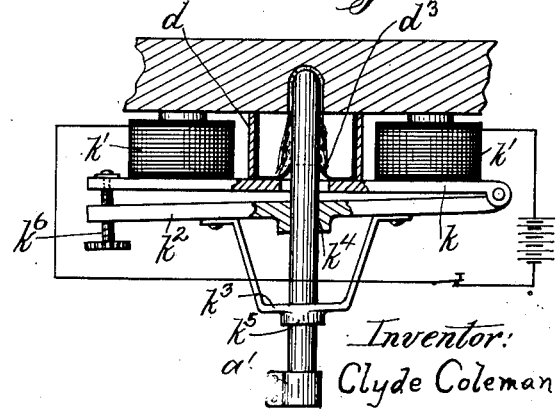

Figure 1 is a view illustrating the applica-
tion of my invention to the boring of holes.
Figs. 2 and 3 are detail views of the peep-
tube. Figs. 4 and 5 are views of the muffle.
Fig. 6 is a view showing a modification of the
muffle. Fig. 7 shows a modification of the
peep-tube. Figs. 8 and 9 are views illustrat-
ing the cored carbon for the introduction of
chemical agents to the arc. Fig. 10 is a modi-
fication showing a carbon with insulated sur-
face. Fig. 11 is a view illustrating a mag-
netic device for facilitating flow of the molten
metal. Fig. 12 is a view of a guiding mech-
anism for the boring of holes.

Like letters refer to like parts in the sev-
eral figures.

The carbon rod rod $a$ carries upon the end
a collar $a'$, which is connected to one side of
the battery $b$, while the opposite side of the
battery is connected to the body $c$ of metal
to be operated upon. The positive pole of
the battery is preferably connected with the
mass of metal, as best results are obtained
thereby. Surrounding the carbon is a shield
or muffle $d$, provided with a hole through
which the carbon is adapted to pass, the
edges of the muffle being adapted to rest
against the surface of the mass of metal. The
cover $d'$ of the muffle is preferably made ad-
justable, so that it may be moved back and
forth to move the carbon into the desired po-
sition. The muffle may be made of fireproof
material, such as fire-clay, or preferably of
metal, with a lining of asbestos or similar
fireproof material.

In Fig. 6 is illustrated a modification of the
muffle, in which the carbon rod is surrounded
by a flexible cover $d^2$, of fireproof material,
which permits the movement of the carbon
rod into any lateral or angular position. In
order that the operation upon the interior of
the muffle may be open to inspection, a win-
dow is provided therein preferably in the
form of a peep-tube $e$, upon the end of which
is provided a glass pane $e'$, pivoted to rotate
about a pin $e^2$. A brush $e^3$ may be provided,
against which the under face of the pane rubs
as the same is rotated to keep the surface
clean. The portion of the pane resting at the
end of the peep-tube should be maintained
continuously clean in order that the vapor or
floating particles within the muffle may not
obscure the vision. I preferably arrange an
air blast or draft to force a column of air
along the peep-tube to maintain the same
clear. The draft may be produced by means
of a suction-pump $f$, drawing the air through
a tube $f'$, connected with the peep-tube $e$, the
entrance to the tube being through the tube
$f^2$. The carbon rod may be cored out to serve
as a peep-tube, as illustrated in Fig. 7, and
the glass pane may be mounted upon the end
of the rod, as illustrated. If the glass pane
is omitted, it would be necessary for the oper-
ator to wear colored glasses, and there would
be danger of vapors or particles escaping
through the peep-tube and attacking the eyes.
For this reason I preferably employ a pane
upon the end of the peep-tube, and this may
be darkened or colored, as desired.

In Fig. 8 I have illustrated a hollow carbon
$a$, through the interior of which may be fed a
stick or rod $g$, of aluminum or other fluxing
agent, for the purpose heretofore described.

In Fig. 9 the hollow core of the carbon is
illustrated as connected with a pipe $h$, which
may be connected with a reservoir or pump
for admitting to the arc a gas, fluid, or pow-
der, as may be desired.

The carbon is illustrated in Fig. 10 as pro-
vided with a covering of insulating material
to prevent the carbon from coming in contact
with the side of the hole being bored or into
contact with the molten metal. This sheath-
ing or covering may be made of porcelain or
preferably of a thin tube of magnesite.

By the provision of the insulating-sheath
the arc is prevented from shifting, and the
molten metal being thus prevented from com-
ing into contact with the sides of the carbon
rod it does not interfere with the operation of
the arc. When the insulating-sheath is not
employed, the contact of the molten metal
with the side of the rod will act to shift the
arc from the end of the rod to the point of
contact of the molten metal. As soon, how-
ever, as the molten metal has been sufficiently
eaten away by the arc the arc is shifted back
to the end of the rod again.

In Fig. 11 is illustrated a helix or solenoid
formed of electrical conductors wound upon
the exterior of the muffle $d$ to produce a mag-
netic field to assist in the removal of the
molten metal from the hole being bored. The
magnet thus formed exerts an attraction upon
the molten metal which draws it from the
hole and, furthermore, assists in the flow of
the molten metal, due to the fact that the
metal being magnetized tends to repel the ad-
jacent metal, on the principle of repulsion of
a bundle of rods subjected to a magnetic
field, thus causing the molten metal to flow
more readily. The conductors of the magnet
may be located in other positions than that
illustrated, but I consider this arrangement
preferable.

Fig. 12 illustrates a guiding device for the
carbon rod. Upon the plate $k$ are mounted
electromagnets $k'$ $k'$, adapted to be included in electrical circuit, the poles thereof being arranged to rest against the surface of the body of metal to be operated upon. Pivoted to plate $k$ is a plate $k^2$, carrying a standard $k^3$. Guides $k^4$ $k^5$ are provided on the plate and standard, respectively, through which the carbon rod $a$ is adapted to pass. By means of the screw $k^6$ the carbon rod may be adjusted to the desired angle. The muffle $d$ is mounted upon the plate $k$, and where the device is to be used in boring holes from beneath the body of metal operated upon an upwardly-extending collar $d^3$ is provided upon the muffle, which surrounds the carbon rod and prevents the molten metal falling into the muffle from interfering with the movement of the carbon rod.

Having described my invention, what I claim as new, and desire to secure by Letters Patent, is—

1. The combination with an electrode between which and a mass of metal an arc is adapted to be formed, of a muffle surrounding the electrode and inclosing the arc and a peep-tube provided with a revolving pane, substantially as described.

2. The combination with an electrode between which and a mass of metal an arc is adapted to be formed, of a muffle surrounding the electrode and inclosing the arc, a peep-tube, and means for creating a blast or draft through the same, substantially as described.

3. The combination with an electrode between which and a mass of metal an arc is adapted to be formed, of a sheathing of insulating and non-combustible material surrounding said electrode, substantially as described.

4. The combination with an electrode between which and a mass of metal an arc is adapted to be formed, of a sheathing of insulating and non-combustible material surrounding said electrode and a muffle surrounding the electrode and inclosing the arc, substantially as described.

5. The combination with an electrode between which and a mass of metal an arc is adapted to be formed, of a muffle surrounding the electrode and inclosing the arc, and a magnetic coil on the muffle for producing a magnetic field, substantially as described.

6. The combination with a hole-boring electrode between which and a mass of metal an arc is adapted to be formed, of means for facilitating and assisting the flow of the molten metal between the electrode and the walls of the hole, substantially as described.

7. The combination with a hole-boring electrode between which and a mass of metal an arc is adapted to be formed, of a muffle surrounding and inclosing the arc, and means for facilitating and assisting the flow of the molten metal between the electrode and the walls of the hole, substantially as described.

8. The combination with an electrode between which and a mass of metal an arc is adapted to be formed, of a magnetically-held standard and guide for said electrode and means for adjusting the position of the electrode, substantially as described.

9. The combination with a mass of metal, of an electrode between which and said mass of metal an arc is adapted to be formed, a muffle entirely inclosing the end of said electrode and having the edges thereof arranged to engage the face of said mass of metal to shield the arc and retain the molten metal, and means for feeding a chemical or fluxing agent through the interior of said electrode to the arc formed at the end thereof, substantially as described.

10. The combination with a mass of metal, of an electrode between which and said mass of metal an arc is adapted to be formed, a muffle entirely inclosing the end of said electrode and having the edges thereof arranged to engage the face of said mass of metal to shield the arc and retain the molten metal, and a window or opening for permitting a view of the interior of the muffle in the vicinity of the arc, substantially as described.

In witness whereof I have hereunto subscribed my name in the presence of two witnesses.

CLYDE COLEMAN.

Witnesses:
W. CLYDE JONES,
M. R. ROCHFORD.